(12) United States Patent
Hurd

(10) Patent No.: US 6,195,756 B1
(45) Date of Patent: Feb. 27, 2001

(54) POWER REDUCTION FOR MULTIPLE-INSTRUCTION-WORD PROCESSORS BY MODIFICATION OF INSTRUCTION WORDS

(75) Inventor: Linda L. Hurd, Sugar Land, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/212,507

(22) Filed: Dec. 15, 1998

Related U.S. Application Data
(60) Provisional application No. 60/068,656, filed on Dec. 23, 1997.

(51) Int. Cl.[7] .................................................. G06F 13/00
(52) U.S. Cl. ............................. 713/340; 713/330; 702/60
(58) Field of Search ................................. 713/340, 310, 713/320, 324, 330; 702/60; 703/22, 26; 712/223, 227

(56) References Cited

U.S. PATENT DOCUMENTS

| | | | |
|---|---|---|---|
| 5,394,558 | * 2/1995 | Arakawa et al. | 712/1 |
| 5,495,617 | 2/1996 | Yamada | 395/750 |
| 5,557,557 | 9/1996 | Frantz et al. | 364/578 |
| 5,584,031 | 12/1996 | Burch et al. | 395/750 |
| 5,630,130 | * 5/1997 | Perotto et al. | 395/677 |
| 5,941,991 | * 8/1999 | Kageshima | 713/340 |
| 6,002,878 | * 12/1999 | Gehman et al. | 713/340 |
| 6,125,334 | * 9/2000 | Hurd | 702/60 |

* cited by examiner

Primary Examiner—Robert Beausoleil
Assistant Examiner—Raymond N Phan
(74) Attorney, Agent, or Firm—Robert D. Marshall, Jr.; W. James Brady, III; Frederick J. Telecky, Jr.

(57) ABSTRACT

A method of optimizing assembly code of a VLIW processor (10) or other processor that uses multiple-instruction words (20), each of which comprise instructions to be executed on different functional units (11d and 11e) of the processor (10). The instruction words (20) are modified in accordance with one or more code optimization techniques (FIG. 6). Typically, the modifications tend to result in fewer cycle-to-cycle bit changes in the machine code, which results in reduced power consumption.

22 Claims, 8 Drawing Sheets

FIG. 3

| PARALLEL DESIGNATOR (P-BIT) | CONDITIONAL REGISTER FIELD | INSTRUCTION TYPE | FUNCTIONAL UNIT | OPERAND FIELD |
|---|---|---|---|---|
| | [A2] | ADD | .L1 | A9, A10, A10 |
| \|\| | | ADD | .L2 | B12, B11, B12 |
| \|\| | | MPYHL | .M1 | A8, A5, A9 |
| \|\| | | MPYH | .M2X | A8, B6, B7 |
| \|\| | | LDW | .D1 | *A0++[2], A5 |
| \|\| | | LDW | .D2 | *B3++[2], B6 |
| \|\| | [B2] | ADD | .S1 | A2, 1, A2 |
| \|\| | | NOP | | |

OPFIELD

| .L Unit | .M Unit | .S Unit | .D Unit |
|---|---|---|---|
| ABS | MPY | ADD | ADD |
| ADD | SMPY | ADDK | ADDA |
| AND | | ADD2 | LD mem |
| CMPEQ | | AND | |
| CMPGT | | B disp | MV |
| CMPGTU | | B IRP | NEG |
| CMPLT | | B NRP | ST mem |
| CMPLTU | | B reg | |
| LMBD | | CLR | SUB |
| MV | | EXT | SUBA |
| NEG | | EXTU | ZERO |
| NORM | | MVC | |
| NOT | | MV | |
| OR | | MVK | |
| SADD | | MVKH | |
| SAT | | NEG | |
| SSUB | | NOT | |
| SUB | | OR | |
| SUBC | | SET | |
| XOR | | SHL | |
| ZERO | | SHR | |
| | | SHRU | |
| | | SSHL | |
| | | SUB | |
| | | SUB2 | |
| | | XOR | |
| | | ZERO | |

FIG. 4B

| ARITHMETIC | MULTIPLY | LOAD/STORE | PROGRAM CONTROL |
|---|---|---|---|
| ABS | MPY | LD | B |
|   absolute value | MPYH |   load | BIRP |
| ADD | MPYHL | MVK | BNRP |
| ADDA | MPYLH | MVKH |   branch |
| ADDK | SMPY |   move | |
| ADD2 |   multiply | ST | |
| SADD | |   store | |
|   addition | | | |
| SAT | | | |
|   saturate | | | |
| SSUB | | | |
| SUB | | | |
| SUBA | | | |
| SUBC | | | |
| SUBB | | | |
|   subtraction | | | |

| BIT MANAGEMENT | LOGICAL | PSUEDO/OTHER |
|---|---|---|
| CLR | AND | IDLE |
|   clear | CMPEQ | MV |
| EXT | CMPBT | MVC |
|   extract | CMPLT |   move |
| LMBD |   compare | NOP |
|   leftmost bit detection | OR | ZERO |
| NORM | SHL | NEG |
|   normalize | SHR | NOT |
| SET |   shift | |
| | SSHL | |
| |   shift w/ saturation | |
| | XOR | |

```
        CMPGT   .L1    A4, 0, A1      ⎫ EP1
    ||  MVK     .S1    32767, A0      ⎭

[A1] NORM   .L1    A4, A3         ⎫
    ||[A1] MVK  .S2    _table, B1     ⎬ EP2
    ||  MVK     .S1    1, A2          ⎭         20
                                                (FP1)
    [A1] AND    .L1    A3, 1, A2      ⎫
    ||[A1] SSHL .S1    A4, A3, A4     ⎬ EP3
    ||[A1] MVKH .S2    _table, B1     ⎭
```

FIG. 5

```
    [A1] SHR    .S2X   A4, 16, B0     ⎫ EP1
    ||[A1] SHR  .S1    A4, 1, A4      ⎭

[A1] EXT    .S1    A4, 16, 16, A4 ⎫ EP2
    ||[A1] SUB  .S2    B0, 16, B0     ⎭         20
                                                (FP2)
         AND    .L1    A4, A0, A4     ⎫ EP3
    ||   ADDAH  .D2    B1, B0, B1     ⎭

[A1] LDH    .D2    *B1++, B0      ⎫ EP4
    ||[A1] MVK  .S1    B0, A2         ⎭
```

```
           ┌─────────────────────────┐
    61 ────│ REORDER INSTRUCTIONS    │
           │ WITHIN IW TO ALIGN      │
           │ FUNCTIONAL UNITS        │
           └───────────┬─────────────┘
                       ▼
           ┌─────────────────────────┐
    63 ────│ REASSIGN FUNCTIONAL     │
           │ UNITS                   │
           └───────────┬─────────────┘
                       ▼
           ┌─────────────────────────┐
    64 ────│ REASSIGN CONDITIONAL    │
           │ REGISTERS               │
           └───────────┬─────────────┘              FIG. 6
                       ▼
           ┌─────────────────────────┐
    65 ────│ REORDER AND             │
           │ REASSIGN OPERANDS       │
           └───────────┬─────────────┘
                       ▼
           ┌─────────────────────────┐
    67 ────│ REARRANGE NOP'S TO      │
           │ SMOOTH CODE PROFILE     │          ◄── 60
           └───────────┬─────────────┘
                       ▼
           ┌─────────────────────────┐
    68 ────│ REPLACE NOP'S WITH      │
           │ DUMMY INSTRUCTIONS      │
           └───────────┬─────────────┘
                       ▼
           ┌─────────────────────────┐
           │ REARRANGE PROGRAM       │
    69 ────│ MEMORY ADDRESS          │
           │ LOCATIONS OF IWs        │
           └─────────────────────────┘
```

FIG. 7A

```
70
            ADD    .L1    A9, A10, A10
||[A2]      ADD    .L2    B12, B11, B12
||          MPYHL  .M1    A8, A5, A9
||          MPYH   .M2X   A8, B6, B7        } FP1
||          LDW    .D1    *A0++[2], A5
||          LDW    .D2    *B3++[2], B6
||[B2]      ADD    .S1    A2, 1, A2
            ADD    .L2X   A11, B12, B11
||          MPYHL  .M2    B9, B10, B8
||          MPYLH  .M1    A8, A5, A8
||          ADD    .L1X   B7, A10, A7       } FP2
||          LDW    .D2    *B1--[2], B9
||          LDW    .D1    *A3--[2], A8
||[!A2]     SHR    .S1    A7, 15, A10
||[!A2]     SHR    .S2    B11, 15, B14
 [B0]       B      .S2    LOOP1
||          MPY    .M2    B9, B10, B11
||          MPY    .M1    A8, A5, A9
||          ADD    .L1X   B8, A7, A7        } FP3
||          ADD    .L2X   A12, B11, B12
||          LDW    .D2    *B3, B10
||[!A1]     SUB    .S1    A0, A14, A0
```

FIG. 7B

```
70
            ADD    .L1    A9, A10, A10
||[A2]      ADD    .L2    B12, B11, B12
||          MPYHL  .M1    A8, A5, A9
||          MPYH   .M2X   A8, B6, B7        } FP1
||          LDW    .D1    *A0++[2], A5
||          LDW    .D2    *B3++[2], B6
||[B2]      ADD    .S1    A2, 1, A2
            ADD    .L1X   B7, A10, A7
||          ADD    .L2X   A11, B12, B11
||          MPYLH  .M1    A8, A5, A8
||          MPYHL  .M2    B9, B10, B8       } FP2
||          LDW    .D1    *A3--[2], A8
||          LDW    .D2    *B1--[2], B9
||[!A2]     SHR    .S1    A7, 15, A10
||[!A2]     SHR    .S2    B11, 15, B14
            ADD    .L1X   B8, A7, A7
||          ADD    .L2X   A12, B11, B12
||          MPY    .M1    A8, A5, A9
||          MPY    .M2    B9, B10, B11      } FP3
||          NOP
||          LDW    .D2    *B3, B10
||[!A1]     SUB    .S1    A0, A14, 10
||[B0]      B      .S2    LOOP1
```

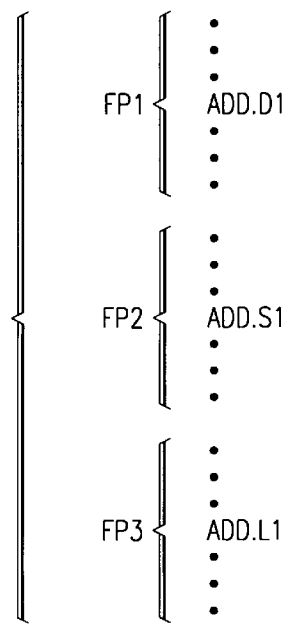

FIG. 8A

FP1 { ADD.D1
FP2 { ADD.S1
FP3 { ADD.L1

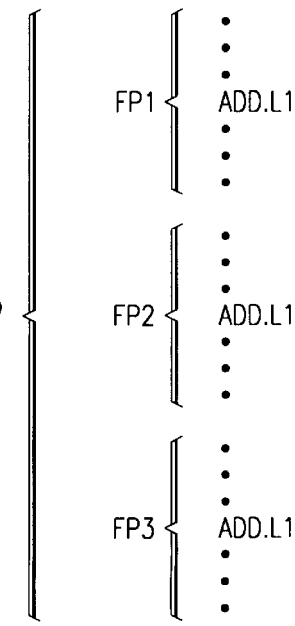

FIG. 8B

FP1 { ADD.L1
FP2 { ADD.L1
FP3 { ADD.L1

FIG. 9A

EP1 {
- LDW   .D2   *B4++, B11
- || LDW   .D1   *A4++, A3
- || MVK   .S2   1, B7
- || MVK   .S1   492, A9
}

EP2 {
- SHL   .S2   B7, 15, B7
- || STW   .D2   B11, *B15--[2]
- || SUB   .L1X  B15, A9, A9
}

EP3 {
- LDW   .D2   *B4++, B11
- || LDW   .D1   *A4++, A3
}

EP4 {
- MVK   .S1   -1, A10
- || STW   .D2   A10, *+B15[1]
- || MV    .L1X  B7, A7
}

EP5 {
- LDW   .D2   *B4++, B11
- || LDW   .D1   *A4++, A3
- || MVKLH .S1   32767, A10
}

EP6 {
- SMPYH .M2X  B11, A3, B2
- || SMPY  .M1X  B11, A3, A2
- || STW   .D2   B10, *B15
}

FIG. 9B

EP1 {
- LDW   .D2   *B4++, B11
- || LDW   .D1   *A4++, A3
- || MVK   .S2   1, B7
- || MVK   .L1   492, A9
}

EP2 {
- SHL   .S2   B7, 15, B7
- || STW   .D2   B11, *B15,--[2]
- || SUB   .L1X  B15, A9, A9
}

EP3 {
- LDW   .D2   *B4++, B11
- || LDW   .D1   *A4++, A3
}

EP4 {
- MVK   .L1   -1, A10
- || STW   .D2   A10, *+B15[1]
- || MV    .D1X  B7, A7
}

EP5 {
- LDW   .D2   *B4++, B11
- || LDW   .D1   *A4++, A3
- || MVKLH .L1   32767, A10
}

EP6 {
- SMPYH .M2X  B11, A3, B2
- || SMPY  .M1X  B11, A3, A2
- || STW   .D2   B10, *B15
}

FIG. 10A

FP1 {
- CMPGT .L1X  B5, 4, A0
- ||[!B0] ADD   .S1   A2, 1, A2
- ||[!A1] ADD   .D1   A2, 1, A2
- ||[!B2] ADD   .S2   3, B5, B5
- ||[!B0] ADD   .L2   3, B5, B5
- ||[!A1] ADD   .D2   1, B5, B5
}

FP2 {
- CMPGT .L1X  B5, A3, A1
- ||[!B2] ADD   .S1   A2, 1, A2
- ||[!B0] ADD   .S1   D2, 1, A2
- ||[!B0] SHL   .S2   B3, 4, B3
- ||[!A1] ADD   .L2   5, B3, B3
- NOP
}

FIG. 10B

FP1 {
- CMPGT .L1X  B5, 4, A0
- ||[!B0] ADD   .S1   A2, 1, A2
- ||[!A1] ADD   .D1   A2, 1, A2
- ||[!B2] ADD   .S2   3, B5, B5
- ||[!A1] ADD   .L2   1, B5, B5
- ||[!B0] ADD   .D2   3, B5, B5
}

FP2 {
- CMPGT .L1X  B5, A3, A1
- ||[!B2] ADD   .S1   A2, 1, A2
- ||[!B0] ADD   .S1   D2, 1, A2
- ||[!B0] SHL   .S2   B3, 4, B3
- ||[!A1] ADD   .L2   5, B3, B3
- NOP
}

FIG. 11A

FP1 {
```
         ADD    .L1    A9, A10, A10
|| [A2]  ADD    .L2    B12, B11, B12
||       MPYHL  .M1    A8, A5, A9
||       MPYH   .M2X   A8, B6, B7
||       LDW    .D1    *A0++[2], A5
||       LDW    .D2    *B3++[2], B6
|| [B2]  ADD    .S1    A2, 1, A2
```
}

FP2 {
```
         ADD    .L1X   B7, A10, A7
||       ADD    .L2X   A11, B12, B11
||       MPYLH  .M1    A8, A5, A8
||       MPYHL  .M2    B9, B10, B8
||       LDW    .D1    *A3--[2], A8
||       LDW    .D2    *B1--[2], B9
|| [!A2] SHR    .S1    A7, 15, A10
|| [!A2] SHR    .S2    B11, 15, B14
```
}

FIG. 11B

FP1 {
```
         ADD    .L1    A9, A10, A10
|| [A2]  ADD    .L2    B11, B12, B12
||       MPYHL  .M1    A8, A5, A9
||       MPYH   .M2X   A8, B6, B7
||       LDW    .D1    *A0++[2], A5
||       LDW    .D2    *B3++[2], B6
|| [B2]  ADD    .S1    A2, 1, A2
```
}

FP2 {
```
         ADD    .L1X   B7, A10, A7
||       ADD    .L2X   A11, B12, B11
||       MPYLH  .M1    A8, A5, A8
||       MPYHL  .M2    B9, B10, B8
||       LDW    .D1    A3--[2], A8
||       LDW    .D2    *B1--[2], B9
|| [!A2] SHR    .S1    A7, 15, A10
|| [!A2] SHR    .S2    B11, 15, B14
```
}

FIG. 12A

FP1 {
```
  •
  SHR  .S2  B4, 15, B4
  •
  •
  •
  NOP
```
}

FP2 {
```
  •
  SUB  .S2  B0, 1, B0
  •
  •
  •
  SUB  .L2  B11, B13, B13
```
}

FP3 {
```
  •
  SUB2 .S2  B10, B11, B3
  •
  •
  •
  SUB  .L2  B0, 1, B1
```
}

FIG. 12B

FP1 {
```
  •
  SHR  .S2  B4, 15, B4
  •
  •
  •
  NOP
```
}

FP2 {
```
  •
  SUB  .S2  B11, B13, B13
  •
  •
  •
  SUB  .L2  B0, 1, B0
```
}

FP3 {
```
  •
  SUB  .S2  B10, B11, B3
  •
  •
  •
  SUB  .L2  B0, 1, B1
```
}

FIG. 13A

| | SLOT 1 | SLOT 2 | SLOT 3 | SLOT 4 | SLOT 5 | SLOT 6 | SLOT 7 | SLOT 8 |
|---|---|---|---|---|---|---|---|---|
| FP1 | ░ | ░ | ░ | ░ | ░ | ░ | NOP | NOP |
| FP2 | ░ | ░ | ░ | ░ | NOP | NOP | NOP | NOP |
| FP3 | ░ | ░ | ░ | ░ | ░ | ░ | ░ | ░ |
| FP4 | ░ | ░ | ░ | ░ | ░ | ░ | NOP | NOP |
| FP5 | ░ | ░ | ░ | ░ | ░ | ░ | ░ | NOP |
| FP6 | ░ | ░ | ░ | ░ | ░ | ░ | NOP | NOP |
| FP7 | ░ | ░ | ░ | ░ | NOP | NOP | NOP | NOP |
| FP8 | ░ | ░ | ░ | ░ | ░ | ░ | ░ | ░ |

FIG. 13B

| | SLOT 1 | SLOT 2 | SLOT 3 | SLOT 4 | SLOT 5 | SLOT 6 | SLOT 7 | SLOT 8 |
|---|---|---|---|---|---|---|---|---|
| FP1 | ░ | ░ | ░ | ░ | ░ | ░ | NOP | NOP |
| FP2 | ░ | ░ | ░ | ░ | ░ | ░ | NOP | NOP |
| FP3 | ░ | ░ | ░ | ░ | ░ | ░ | ░ | NOP |
| FP4 | ░ | ░ | ░ | ░ | ░ | ░ | NOP | NOP |
| FP5 | ░ | ░ | ░ | ░ | ░ | ░ | NOP | NOP |
| FP6 | ░ | ░ | ░ | ░ | ░ | ░ | ░ | NOP |
| FP7 | ░ | ░ | ░ | ░ | ░ | ░ | NOP | NOP |
| FP8 | ░ | ░ | ░ | ░ | ░ | ░ | NOP | NOP |

FIG. 14A

| CYCLE | INSTRUCTION IN SLOT n |
|---|---|
| 1 | MPY .M2X B12, A13, B12 |
| 2 | NOP |
| 3 | MPY .M2  B1, 1, B2 |

FIG. 14B

| CYCLE | INSTRUCTION IN SLOT n |
|---|---|
| 1 | MPY .M2X B12, A13, B12 |
| 2 | MPY .M2X BXX, A13, B12 |
| 3 | MPY .M2  B1, 1, B2 |

FIG. 15A

| CYCLE | INSTRUCTION IN SLOT n |
|---|---|
| 1 | ADD .L1  A11, A12, A15 |
| 2 | NOP |
| 3 | SUB .L1  A9, A10, A12 |

FIG. 15B

| CYCLE | INSTRUCTION IN SLOT n |
|---|---|
| 1 | ADD .L1  A11, A12, A15 |
| 2 | [!B0] ADD .L1  A11, A12, A15 |
| 3 | SUB .L1  A9, A10, A12 |

US 6,195,756 B1

POWER REDUCTION FOR MULTIPLE-INSTRUCTION-WORD PROCESSORS BY MODIFICATION OF INSTRUCTION WORDS

This application claims priority under 35 USC §119(e)(1) of Provisional Application No. 60/068,656, filed Dec. 23, 1997.

TECHNICAL FIELD OF THE INVENTION

This invention relates to microprocessors, and more particularly to methods of using programming instructions in a manner that reduces the power consumption of a processor.

BACKGROUND OF THE INVENTION

Power efficiency for processor-based equipment is becoming increasingly important as people are becoming more attuned to energy conservation issues. Specific considerations are the reduction of thermal effects and operating costs. Also, apart from energy conservation, power efficiency is a concern for battery-operated processor-based equipment, where it is desired to minimize battery size so that the equipment can be made small and lightweight. The "processor-based equipment" can be either equipment designed especially for general computing or equipment having an embedded processor.

From the standpoint of processor design, a number of techniques have been used to reduce power usage. These techniques can be grouped as two basic strategies. First, the processor's circuitry can be designed to use less power. Second, the processor can be designed in a manner that permits power usage to be managed.

On the other hand, given a particular processor design, its programming can be optimized for reduced power consumption. Thus, from a programmer's standpoint, there is often more than one way to program a processor to perform the same function. For example, algorithms written in high level programming languages can be optimized for efficiency in terms of time and power. Until recently, at the assembly language level, most optimization techniques have been primarily focussed on speed of execution without particular regard to power use.

The programmer's task of providing power efficient code can be performed manually or with the aid of an automated code analysis tool. Such a tool might analyze a given program so to provide the programmer with information about its power usage information. Other such tools might actually assist the programmer in generating optimized code.

U.S. Pat. No. 5,557,557, to Franz, et al., entitled "Processor Power Profiler", assigned to Texas Instruments Incorporated, describes a method of modeling power usage during program execution. A power profiler program analyzes the program and provides the programmer with information about energy consumption. A power profiler is also described in U.S. patent Ser. No. 06/046,811, to L. Hurd, entitled "Module-Configurable, Full-Chip Power Profiler", now U.S. Pat. No. 6,125,334 assigned to Texas Instruments Incorporated.

Once the power requirements of a particular program are understood, the code can be optimized. Automating this aspect of programming requires a code generation tool that can restructure computer code, internal algorithms as well as supporting functions, for minimum power usage.

SUMMARY OF THE INVENTION

One aspect of the invention is a method of optimizing computer programs for power usage. It is based on the recognition that power consumption is reduced when there is a minimum of change in the machine-level representation of the program from each CPU cycle to the next. The method is useful for various types of processors that execute "multiple-instruction words" (as defined herein) by different functional units of the processor. Examples of such processors are VLIW (very long instruction word) processors and dual datapath processors.

The method comprises a set of steps, any of one which may be performed independently. Each step involves scanning the code and comparing a given field or other code sequence within instructions. Generally, it is the code syntax that is of interest, as opposed to its functionality. It is determined if there are code sequences where cycle-to-cycle bit changes in the machine code representation of that code sequence can be minimized. Then, the code is modified if this can be done without adversely affecting code functionality.

For example, one aspect of the invention is a method where the code sequences of interest are functional unit assignments. Typically, each instruction of the instruction word occupies a "slot" of the word. For each slot, the field that identifies the functional unit is scanned. Cycle-to-cycle bit changes in this field are reduced by re-arranging instructions within instruction words. Because instructions are merely re-arranged, code functionality is not affected.

An advantage of the invention is that it is directed to optimization at the processor architecture level, rather than to high level programming. This permits a processor to be programmed in a manner that is most efficient for that processor. The method can be easily adapted to the characteristics of the processor and its instruction set.

BRIEF DESCRIPTION OF THE DRAWINGS

FIG. 3 illustrates an example of the fetch packet of FIG. 2.

FIG. 4A illustrates the mapping of the instruction types for the processor of FIG. 1 to the functional units in its datapaths.

FIG. 4B is a table describing the mnemonics of FIG. 4A.

FIG. 5 illustrates a fetch packet having multiple execute packets.

FIG. 6 illustrates a code optimization process in accordance with the invention.

FIGS. 7A and 7B illustrate an example of unoptimized code together with the corresponding optimized code, respectively, where the optimization has been performed in accordance with Step 63 of FIG. 6.

FIGS. 8A and 8B illustrate an example of unoptimized code together with the corresponding optimized code, respectively, where the optimization has been performed in accordance with Step 63 of FIG. 6.

FIGS. 9A and 9B illustrate an example of unoptimized code together with the corresponding optimized code, respectively, where the optimization has been performed in accordance with Step 63 of FIG. 6.

FIGS. 10A and 10B illustrate an example of unoptimized code together with the corresponding optimized code, respectively, where the optimization has been performed in accordance with Step 64 of FIG. 6.

FIGS. 11A and 11B illustrate an example of unoptimized code together with the corresponding optimized code, respectively, where the optimization has been performed in accordance with Step 65 of FIG. 6.

FIGS. 12A and 12B illustrate an example of unoptimized code together with the corresponding optimized code, respectively, where the optimization has been performed in accordance with Step 65 of FIG. 6.

FIGS. 13A and 13B illustrate an example of unoptimized code together with the corresponding optimized code, respectively, where the optimization has been performed in accordance with Step 67 of FIG. 6.

FIGS. 14A and 14B illustrate an example of unoptimized code together with the corresponding optimized code, respectively, where the optimization has been performed in accordance with Step 68 of FIG. 6.

FIGS. 15A and 15B illustrate an example of unoptimized code together with the corresponding optimized code, respectively, where the optimization has been performed in accordance with Step 68 of FIG. 6.

DETAILED DESCRIPTION OF THE INVENTION

The invention described herein is directed to power management for microprocessors. An underlying principle of operation is that the programming provided to the processor can be optimized so as to reduce power usage. Given a particular instruction set, a program using these instructions can be analyzed to detect the presence of non-optimal instruction sequences. These sequences can be modified so that power usage is more efficient, without adversely affecting code functionality.

The method of the invention is most useful with VLIW (very long instruction word) processors, which are characterized by their ability to execute multiple instructions in parallel using different functional units within the processor. The invention is also useful with "dual datapath" processors, which execute two instructions in parallel on two datapaths. Both types of processors execute "multiple-instruction words" in parallel in more than one functional unit. However, parallelism is not a limitation of the invention, and any processor that fetches and decodes more than one instruction at a time will benefit from the optimization process. As explained below, for such processors, cycle-to-cycle instruction fetching, decoding, and dispatching can be optimized for power if the code is arranged properly.

In light of the preceding paragraph, the term "processor" as used herein may include various types of micro controllers and digital signal processors (DSPs). To this end, the following description is in terms of DSPs—the TMS320 family of DSPs and the TMS320C6x DSP in particular. However, this selection of a particular processor is for purposes of description and example only.

Processor Overview

Figure 1:
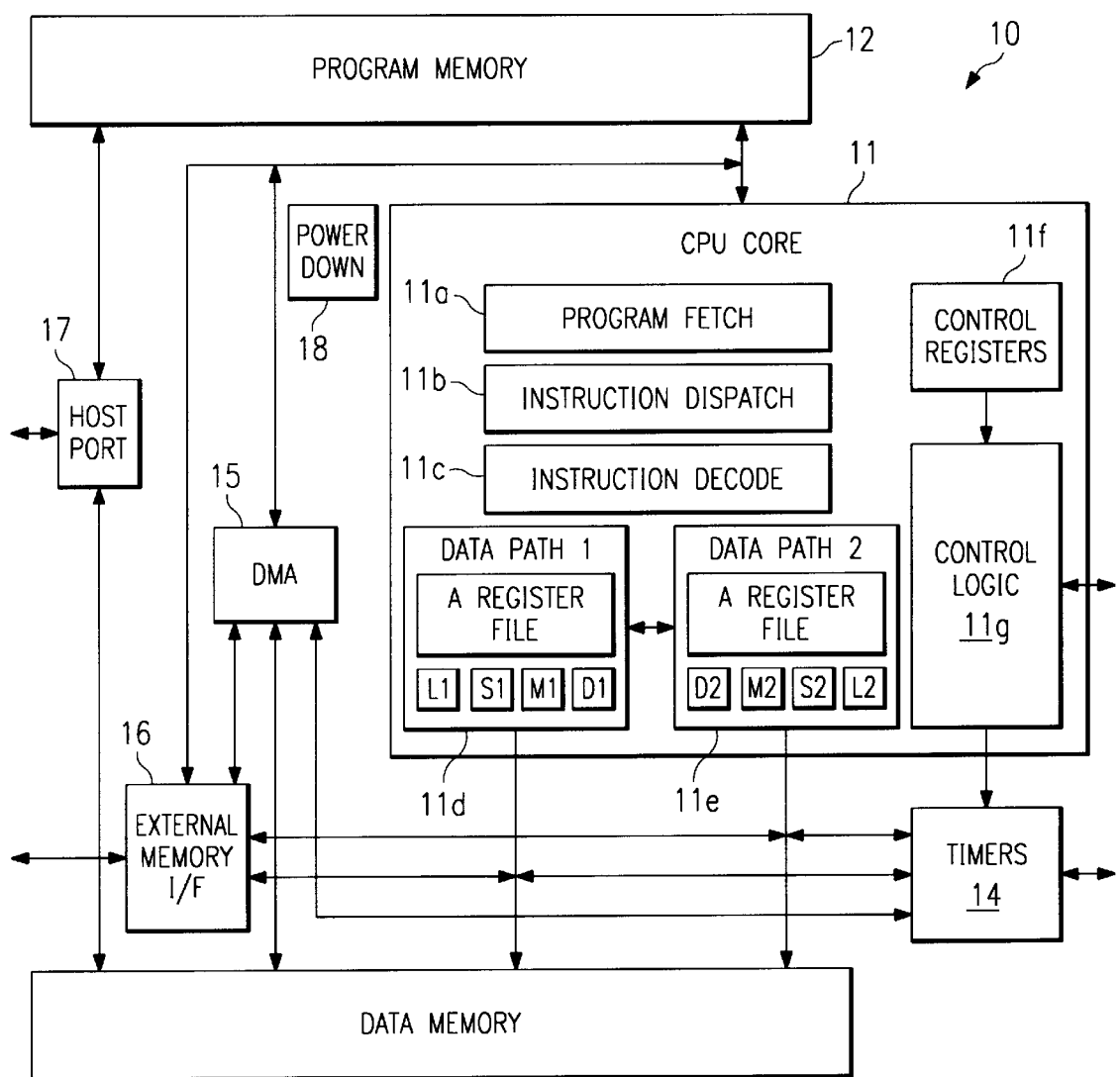
FIG. 1 is a block diagram of a VLIW DSP processor.

FIG. 1 is a block diagram of a DSP processor 10. As explained below, processor 10 has a VLIW architecture, and fetches multiple-instruction words (as "fetch packets") to be executed in parallel (as "execute packets") during a single CPU clock cycle. In the example of this description, processor 10 operates at a 5 nanosecond CPU cycle time and executes up to eight instructions every cycle.

Processor 10 has a CPU core 11, which has a program fetch unit 11a, and instruction dispatch unit 11b and decode unit 11c. To execute the decoded instructions, processor 10 has two datapaths 11d and 11e.

Instruction decode unit 11c delivers execute packets having up to eight instructions to the datapath units 11d and 11e every clock cycle. Datapaths 11d and 11e each include 16 general-purpose registers. Datapaths 11d and 11e each also include four functional units (L, S, M, and D), which are connected to the general-purpose registers. Thus, processor 10 has eight functional units, each of which may execute one of the instructions in an execute packet. Each functional unit has a set of instruction types that it is capable of executing.

The control registers 11f provide the means to configure and control various processor operations. The control logic unit 11g has logic for control, test, emulation, and interrupt functions.

Processor 10 also comprises program memory 12, data memory 13, and timers 14. Its peripheral circuitry includes a direct memory access (DMA) controller 15, external memory interface 16, host port 17, and power down logic 18. The power down logic 18 can halt CPU activity, peripheral activity, and timer activity to reduce power consumption. These power down modes, as well as features of processor 10 other than the features of the present invention, are described in U.S. Pat. No. 6,125,334, referenced in the Background and incorporated herein by reference.

Processor 10 executes RISC-like code, and has an assembly language instruction set. In other words, each of its VLIWs comprises RISC-type instructions. A program written with these instructions is converted to machine code by an assembler. Processor 10 does not use microcode or an internal microcode interpreter, as do some other processors. However, the invention described herein could be applicable regardless of whether RISC-like instructions control the processor or whether instructions are internally interpreted to a lower level.

In the example of this description, eight 32-bit instructions are combined to make the VLIW. Thus, in operation, 32-bit instructions are fetched eight at a time from program memory 12, to make a 256-bit instruction word. The "fetch packet" is comprised of these eight instructions fetched from memory 12.

Figure 2:
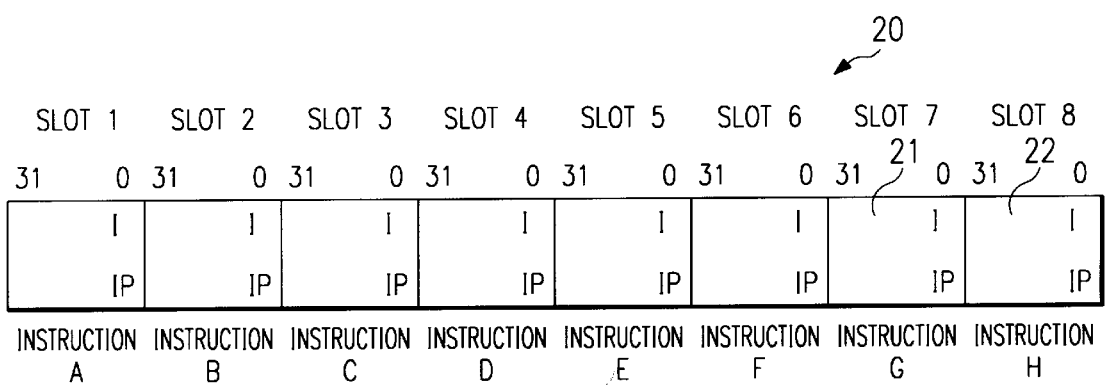
FIG. 2 illustrates the basic format of a fetch packet used by the processor of FIG. 1.

FIG. 2 illustrates the basic format of the fetch packet 20 used by processor 10. Each of the eight instructions in fetch packet 20 is placed in a location referred to as a "slot" 21. Thus, fetch packet 20 has Slots 1, 2, . . . 8.

Processor 10 differs from other VLIW processors in that the entire fetch packet is not necessarily executed in one CPU cycle. All or part of a fetch packet is executed as an "execute packet". In other words, a fetch packet can be fully parallel, fully serial, or partially serial. In the case of a fully or partially serial fetch packet, where the fetch packet's instructions require more than one cycle to execute, the next fetch can be postponed. This distinction between fetch packets and execute packets permits every fetch packet to contain eight instructions, without regard to whether they are all to be executed in parallel.

For processor 10, the execution grouping of a fetch packet 20 is specified by a "p-bit" 22 in each instruction. In operation, instruction dispatch unit 11b scans the p-bits, and the state of the p-bit of each instruction determines whether the next instruction will be executed in parallel with that instruction. If so, its places the two instructions are in the same execute packet to be executed in the same cycle.

FIG. 3 illustrates an example of a fetch packet 20. Whereas FIG. 2 illustrates the format for the fetch packet 20, FIG. 3 illustrates an example of instructions that a fetch packet 20 might contain. A fetch packet 20 typically has five to eight instructions, and the fetch packet 20 of FIG. 3 has seven. Each instruction has a number of fields, which ultimately are expressed in bit-level machine code.

The || characters signify that an instruction is to execute in parallel with the previous instruction, and is coded as p-bit 22. As indicated, fetch packet 20 is fully parallel, and may be executed as a single execute packet.

The square brackets [ ] signify a conditional instruction, surrounding the identifier of a condition register. Thus, the first instruction in FIG. 3 is conditioned on register A2 being nonzero. A ! character signifies "not", so that a condition on A2 being zero would be expressed as [!A2]. The conditional register field comprises these identifiers.

The opfield contains an instruction type from the instruction set of processor 10. Following the instruction type is the designation of the functional unit that will execute the instruction. As stated above in connection with FIG. 1, each of the two datapaths 11*d* and 11*e* has four functional units. These functional units are L (logical), S (shift), M (multiply), and D (data). The opfield thus has the syntax [instruction type]. [functional unit identifier].

Some instruction types can be performed by only one functional unit and some can be performed by one of a number of them. For example, only the M unit can perform a multiply (MPY). On the other hand, an add (ADD) can be performed by the L, S, or D unit. The correspondence of functional units to instructions is referred to herein as their "mapping".

FIG. 4A is a table illustrating, for processor 10, the mapping of instruction types to functional units. It is useful for an understanding of the examples set out below in connection with code optimization. FIG. 4B illustrates the description of each mnemonic.

The mapping of functional units to instruction types determines which instructions can be executed in parallel, and therefore whether a fetch packet will become more than one execute packet. For example, if only the M unit can perform a multiply (MPY), an execute packet could have two MPY instructions, one to be executed by each of the two datapaths 11*d* and 11*e*. In contrast, the L, S, and D units are all capable of executing an add (ADD), thus an execute packet could contain as many as six ADD instructions.

Referring again to FIG. 3, the instruction's operand field follows the opfield. Depending on the instruction type, the operand field may identify one or more source registers, one or more constants, and a destination register.

FIG. 5 is an example of code having multiple execute packets per fetch packet 20. In this example, there are two fetch packets 20. The first fetch packet 20 is executed in three execute packets, EP1, EP2, and EP3. The second fetch packet 20 is executed in four execute packets, EP1, EP2, EP3, and EP4.

To generalize the above-described processor architecture, an executable instruction word, i.e., an execute packet, contains up to eight instructions to be executed in parallel during a CPU cycle. Each instruction in an execute packet uses a different one of the functional units (L, D, S or M) of datapaths 11*d* and 11*e*. The instruction mapping determines which instruction types can be duplicated within an execute packet.

The use of instruction words in this manner lends itself to unique techniques for power optimization. As explained below, within an instruction word, instructions can be arranged so that, for each slot, changes from cycle to cycle are minimized.

Power Optimization Process

FIG. 6 illustrates a code optimization process in accordance with the invention. Each step involves a different code optimization technique. Each step could be performed alone as an independent code optimization technique, or in combination with one or more of the other steps.

Each of these steps is explained below, together with one or more examples of code optimization in accordance with that step. The code examples are consistent with the architecture of processor 10 as described above in connection with FIGS. 1–5. Specifically, the examples are consistent with a processor 10 that uses fetch packets that may be divided into execute packets, and special considerations for this distinction between fetch packets and execute packets are noted.

However, the invention is equally useful for processors whose fetch packets are the same as the execute packets, as well as for processors that do not use "packets" in the conventional sense. The common characteristic of the code to be optimized is that it has "multiple-instruction words". The term "multiple-instruction word" is used to signify a set of instructions, where the instructions within the set are grouped at some point within the processor for processing (which may include fetching, decoding, dispatching, executing, or some combination of these functions), and where the executing is by different functional units of the processor. The "multiple-instruction word" may be structured as a fetch packet, or as an execute packet, or it may have a structure different from a conventional packet structure.

In general, each optimization technique is ultimately directed to finding and minimizing cycle-to-cycle bit changes in the binary representation of the assembly code. This is achieved without substantially affecting the overall functionality in terms of the number and type of instructions. Because the functionality is substantially the same, the result is less node switching when instructions are fetched from program memory and when they are decoded and dispatched. This in turn, reduces power consumption. Each step of the overall optimization process is directed to finding and minimizing a different category of bit changes. In a general sense, the code is scanned for various syntax features as opposed to functional features.

Step 61 of the code optimization process is re-ordering slot assignments within fetch packets. For each fetch packet, the instructions are viewed by slot assignment. It is determined whether instructions within a fetch packet can be re-ordered so that changing of functional units from cycle to cycle is minimized. The effect of Step 61 is a "vertical aligning" of functional unit assignments.

FIGS. 7A and 7B illustrate an example of Step 61. FIG. 7A shows an instruction stream 70 before the optimization of Step 61. FIG. 7B shows almost the same instruction stream 70, optimized in accordance with Step 61.

Instruction stream 70 has three fetch packets. As illustrated, in the second fetch packet, the optimization of Step 61 moves an instruction having an ADD.L1X opfield to a slot in which there was an ADD.L1 opfield in the previous fetch packet. The opfield is the same with the addition of an "X" signifying a cross path. In the third fetch packet, Step 61 moves two instructions, one with an opfield ADD.L1X and the other with an opfield ADD.L2X, to the same slots as instructions having corresponding opfields in the previous two fetch packets. Likewise, Step 61 moves the B (branch) instruction so that the LDW.D2 instruction may occupy the same slot as the LDW.D2 instructions of the previous packets. A NOP (no operation) instruction is used as a place holder so that the same slots will have the same instruction type.

Step 61 can be applied to fetch packets having more than one execute packet. In this case, the order of the execute packets must be preserved, but slot assignments can be changed within an execute packet. In general, code having a single execute packet per fetch packet, such as the code of FIGS. 7A and 7B, will be optimized to a greater extent than code having multiple execute packets per fetch packet.

The above examples are specific to processor 10, whose instructions have an opfield containing both the instruction type and the functional unit assignment. For other processors, the functional unit assignment may be in a different field. In any event, the optimization of Step 61 is directed to re-ordering instructions within fetch packets so as to align functional unit assignments. This alignment of functional unit assignments reduces the number of bits changing in each slot from one cycle to the next.

Step 63, like Step 61, aligns functional unit assignments to avoid unnecessary switching between them. However, Step 63 involves providing new functional unit assignments rather than re-ordering existing instructions.

Step 63 is based on the fact that there are certain instructions that are executable by more than one type of functional unit. For example, referring again to FIG. 4, processor 10 has certain instructions that can be executed on both the L and S functional units, and some of these can be executed on the D units as well.

FIGS. 8A and 8B are examples of unoptimized code and optimized rode, respectively, where the optimization has been performed in accordance with Step 63. As indicated, an instruction stream has three fetch packets, and each fetch packet has an ADD instruction in the same slot. The unoptimized code of FIG. 8A is executable because the ADD instruction can be performed on any of the functional units (D, S, or L). However, switching between them is unnecessary. Thus, in FIG. 8B, the same functional unit (L) is used for all three ADD instructions.

FIGS. 9A and 9B are another example of optimization in accordance with Step 63. This example illustrates optimization of fetch packets having multiple execute packets. In this case, the cycle-to-cycle analysis of functional unit assignments is directed to execute packets. However, the same concept would apply if the execute packets were fetched as fetch packets.

The optimization illustrated by FIGS. 9A and 9B is best understood by charting the cycle-by-cycle usage of the functional units. For the code of FIG. 9A, which is the code before optimization, such a chart would be:

| cycle | M1 | S1 | L1 | D1 | M2 | S2 | L2 | D2 |
|---|---|---|---|---|---|---|---|---|
| 1 | | MVK | | LDW | | MVK | | LDW |
| 2 | | SUBX | | | | SHL | | STW |
| 3 | | | | LDW | | | | LDW |
| 4 | | MVK | MV | | | | | STW |
| 5 | | MVKLH | | LDW | | | | LDW |
| 6 | SMPY | | | | | SMPY | | STW |

For the optimized code of FIG. 9B, the chart would be:

| cycle | M1 | S1 | L1 | D1 | M2 | S2 | L2 | D2 |
|---|---|---|---|---|---|---|---|---|
| 1 | | | MVK | LDW | | MVK | | LDW |
| 2 | | | SUBX | | | SHL | | STW |
| 3 | | | | LDW | | | | LDW |
| 4 | | | MVK | MV | | | | STW |
| 5 | | | MVKLH | LDW | | | | LDW |
| 6 | SMPY | | | | | SMPY | | STW |

As in the example of FIGS. 8A and 8B, functional units are re-assigned to avoid unnecessary switching between functional units from cycle to cycle. The optimization results in better alignment of the functional units.

Step 64 is directed to instructions having conditional field assignments. A characteristic of processor 10 is that the 3-bit conditional register field is all 0's for an unconditional instruction. Conditions of registers B0, B1, and A1 have only one "1" in the conditional field. On the other hand, conditions of registers B2 and A2 have two "1's". Thus, to minimize the number of bits changing from unconditional instructions to conditional instructions, registers B0, B1, and A1 are preferred.

FIGS. 10A and 10B illustrate an example of Step 64. Comparing the unoptimized code of FIG. 10A to the optimized code of FIG. 10B, in the first cycle, Step 64 exchanges the ADDs on S2 and D2. As a result of this modification, the number of bits changing in the conditional register field and operand field is reduced. Considering only Slots 5 and 6, in the unoptimized code, the conditional and operand fields are:

| cycle | L2 | D2 |
|---|---|---|
| 1 | [!B0] . . . 3,B5,B5 | [!A1] . . . 1,B5,B5 |
| 2 | [!A1] . . . 5,B3,B3 | NOP |

This results in 15 bit changes: 8 for the L2 instruction (2+2+2+2) and 7 for the D2 instruction (2+1+2+2). In the optimized code, Slots 5 and 6, these fields are:

| cycle | L2 | D2 |
|---|---|---|
| 1 | [!A1] . . . 1,B5,B5 | [!B0] . . . 3,B5,B5 |
| 2 | [!A1] . . . 5,B3,B3 | NOP |

This results in 13 bit changes: 5 for the L2 instruction (0+1+2+2) and 8 for the D2 instruction (2+2+2+2). This optimization reduces power usage by instruction dispatch unit 11b and instruction decode unit 11c.

Step 65 of the optimization process analyzes the operand field of the instructions. Operands are re-ordered or registers re-assigned, if this would result in a lower number of bits changing in the operand field. As described above in connection with FIG. 3, depending on the instruction type, the operand field will identify various source registers, a destination register, or constants. It is a large field in proportion to the total bit size of the instruction. For example, for processor 10, the operand field is 15 bits of the 32-bit instructions. Thus, Step 65 can have an important effect on power optimization.

FIGS. 11A and 11B are an example of optimization in accordance with Step 65. In this example, the re-ordering of operands is within an instruction. The unoptimized code of FIG. 11A is optimized in FIG. 11B. Two fetch packets are shown, with each fetch packet being executed in a single execute cycle.

Considering only Slot #2 for each of the two cycles, the unoptimized code of FIG. 11A is:

| cycle | instruction in slot #2 | |
|---|---|---|
| 1 | [A2] ADD .L2 | B12,B11,B12 |
| 2 | ADD .L2X | A11,B12,B11 |

The optimized code of FIG. 11B is:

| cycle | instruction in slot #2 | |
|---|---|---|
| 1 | [A2] ADD .L2 | B11,B12,B12 |
| 2 | ADD .L2X | A11,B12,B11 |

The binary code for 11 is 1011, and the binary code for 12 is 1100. Thus, the re-ordering of the operands in slot #2 reduces the number of bits changing in the operand field by six.

FIGS. 12A and 12B are another example of Step 65, showing unoptimized code and the corresponding optimized code, respectively. Here, the re-ordering of operands involves a switch between two different instructions. Slots 2 and 8 of three fetch packets are shown. Comparing the fetch packets of the second cycle (FP2) of the unoptimized code of FIG. 12A to the optimized code of FIG. 12B, the SUB instructions on S2 and L2 have been switched. This reduces the number of bits changing in the operand fields of Slots 2 and 8.

Step 65 can also be accomplished with an overall assessment of register use. When there is a choice of registers to use in a given instruction, the register that causes the fewest bits to change from the previous or next instruction can be selected.

Step 67 is re-arranging NOP (no operation) instructions so as to provide a smoother code profile. More specifically, Step 67 determines whether there are NOPs that can be moved from one fetch packet to another without affecting the functionality of the code.

FIGS. 13A and 13B illustrate an example of unoptimized code and the corresponding optimized code, respectively, where the optimization is in accordance with Step 67. The code has eight fetch packets, FP1 . . . FP8. The shaded slots contain instructions that are not NOP instructions. As illustrated in the example of FIG. 13B, a number of NOP instructions have been moved from one fetch packet to another. Because a NOP instruction is all 0's, their placement has a significant effect on the number of bits changing from cycle to cycle.

Step 68 is adding dummy instructions to reduce the number of times that a slot switches from NOP to a non-NOP instruction back to a NOP instruction. These dummy instructions duplicate most of the previous or upcoming instruction without adversely affecting data integrity.

FIGS. 14A and 14B are an example of unoptimized code and the corresponding optimized code, respectively, where the optimization is in accordance with Step 68. Only a single slot of three fetch packets is shown. FIG. 14A is an example of unoptimized code, having a NOP instruction in Slot 2 in the second cycle. FIG. 14B is the optimized code, where the NOP has been replaced with a dummy MPY instruction. The dummy instruction does not affect the integrity of the data because the result has been placed in a destination register, Bxx, which is an unused register in the code segment. Because the dummy instruction duplicates much of the preceding and following instructions, the internal toggle activity of processor 10 is reduced. Step 68 is most effective for loop code segments.

FIGS. 15A and 15B illustrate another example of unoptimized code and the corresponding optimized code, respectively, where the optimization is in accordance with Step 68. This example is of a code segment within a loop. As in FIG. 14A, in the unoptimized code of FIG. 15A, in Slot 2, the instructions switch from a non-NOP to a NOP to a non-NOP. In the optimized code of FIG. 15B, the dummy instruction is a false conditional instruction. For false conditional instructions, the transfer of the result from functional unit to destination register is always disabled. A conditional register, B0, has been reserved for use with dummy instructions. Before entering the loop, the conditional register is set to some value. In the example of FIGS. 15A and 15B, B0 is used for the dummy instruction register and is also the loop counter. Because B0 is non-zero until the final pass of the loop, for all but the final pass, the result of the conditional instruction is not written to A12. On the final pass, the result is written to A12. However, because A12 is not written to in the preceding instruction and is not used as a source in the following instruction, data integrity is not affected. In cycle 3, the instruction writes to A12, which was the original function of the code.

Typically, the optimal dummy instruction for Step 68 will be a dummy instruction using a false conditional, such as in the example of FIGS. 15A and 15B. However, in some cases, such as when a conditional register is not available, an alternative dummy instruction, such as that of FIGS. 14A and 14B, may be used. As a result of Step 68, fewer bits change state in the in-coming instruction stream from program memory 12. Also, fewer nodes change in decode unit 11c.

Step 69 of the optimization process is to analyze address locations of fetch packets in program memory 12. For sections of code that are executed repeatedly, such as in loops, the number of bits changing on program memory address lines can be minimized.

As a simplified example of Step 69, assume that a first fetch packet of a loop has address . . . 0111 and the next has the address . . . 1000 in program memory 12. Each time the program memory 12 switches from accessing the first packet to accessing the second packet, four address bits change. If the second packet were moved to address . . . 0110, then only one bit would change.

Automation of the Optimization Process

Each of the above-described optimization techniques could be performed manually by an assembly code programmer. However, in more sophisticated embodiments of the invention, one or more of the techniques are performed automatically, with a code generation tool. Such a tool would be programmed to detect code sequences in which a particular technique is applicable and to perform the optimization called for by that technique.

Some of the above-described steps are accomplished without affecting the functionality of the code from one cycle to the next. These steps include Steps 61, 63, 64, 65, and 69.

Other of the above-described steps are capable of affecting code functionality. These steps include Steps 67 and 68. For these optimization techniques, the automated optimization process could include heuristic rules to resolve functionality issues. Alternatively, the optimization process could output a message to the programmer, indicating that an optimization might be possible at the programmer's option.

Other Embodiments

Although the present invention has been described in detail, it should be understood that various changes, substitutions, and alterations can be made hereto without departing from the spirit and scope of the invention as defined by the appended claims.

What is claimed is:

1. A method of reducing power usage by a processor that processes multiple-instruction words, such that instructions in each said of said words are executed by different functional units of said processor, during one or more processor cycles, comprising the steps of:

comparing the syntax of a number of said instruction words;

determining whether, from cycle to cycle, the number of bit changes in the binary representations of any of said instruction words can be reduced by changing bits without substantially affecting functionality of said instruction words; and modifying at least one of said instruction words in accordance with said determining step.

2. The method of claim 1, wherein said comparing, determining, and modifying steps are directed to a functional unit identifier within each said instruction, and wherein said modifying step is performed by re-ordering instructions within said instruction words.

3. The method of claim 1, wherein said comparing, determining, and modifying steps are directed to a functional unit assignment within each said instruction, and wherein said modifying step is performed by replacing said functional unit assignment with another functional unit assignment.

4. The method of claim 1, wherein said comparing, determining, and modifying steps are directed to a conditional register assignment within each said instruction, and wherein said modifying step is performed by re-assigning a conditional register.

5. The method of claim 1, wherein said comparing, determining, and modifying steps are directed to operands within each said instruction, and wherein said modifying step is performed by re-ordering operands.

6. The method of claim 1, wherein said comparing, determining, and modifying steps are directed to operands within each said instruction, and wherein said modifying step is performed by re-assigning operand locations.

7. The method of claim 1, wherein said comparing, determining, and modifying steps are directed to no-operation instructions, and wherein said modifying step is performed by moving said no-operation instruction from one of said instruction words to another.

8. The method of claim 1, wherein said comparing, determining, and modifying steps are directed to no-operation instructions, and wherein said modifying step is performed by replacing said no-operation instructions with dummy instructions.

9. The method of claim 1, wherein said processor is a very long instruction word processor.

10. The method of claim 1, wherein said processor is a dual datapath processor.

11. The method of claim 1, wherein said multiple instruction words are fetch packets, such that all instructions in each of said instruction words are fetched from a memory at substantially the same time.

12. A method of reducing power usage by a processor that processes multiple-instruction words, such that instructions in each said of said words are executed by different functional units of said processor, during one or more processor cycles, comprising the steps of:

comparing, for the first instruction of each of a number of instruction words, functional unit assignments;

determining whether, from cycle to cycle, the number of bit changes in the binary representation of said functional unit assignments can be reduced;

modifying at least one of said first instructions in accordance with said determining step; and repeating said comparing, determining, and modifying steps for each next instruction of said number of instruction words.

13. The method of claim 12, wherein said modifying step is performed by re-ordering instructions within said instruction words.

14. The method of claim 12, wherein said modifying step is performed by replacing a functional unit assignment with another functional unit assignment.

15. A method of reducing power usage by a processor that processes multiple-instruction words, such that instructions in each said of said words are executed by different functional units of said processor, during one or more processor cycles, comprising the steps of:

comparing, for the first instruction of each of a number of instruction words, operand fields;

determining whether, from cycle to cycle, the number of bit changes in the binary representation of any of said operand fields can be reduced;

modifying at least one of said first instructions in accordance with said determining step; and repeating said comparing, determining, and modifying steps for each next instruction of said number of instruction words.

16. The method of claim 15, wherein said comparing, determining, and modifying steps are directed to operands within each said instruction, and wherein said modifying step is performed by re-ordering operands.

17. The method of claim 15, wherein said comparing, determining, and modifying steps are directed to operands within each said instruction, and wherein said modifying step is performed by re-assigning operand locations.

18. A method of reducing power usage by a processor that processes multiple-instruction words, such that instructions in each said of said words are executed by different functional units of said processor, during one or more processor cycles, comprising the steps of:

comparing the first instruction of each of a number of instruction words; thereby detecting no-operation instructions;

determining whether, from cycle to cycle, the number of bit changes in the binary representations of any of said first instructions can be reduced;

modifying at least one of said first instructions in accordance with said determining step; and repeating said comparing, determining, and modifying steps for each next instruction of said number of instruction words.

19. The method of claim 18, wherein modifying step is performed by moving said no operation instruction from one of said instruction words to another.

20. The method of claim 18, wherein modifying step is performed by replacing said no operation instruction with a dummy instruction.

21. A method of reducing power usage by a processor that processes multiple-instruction words, such that instructions in each said of said words are executed by different functional units of said processor, during one or more processor cycles, comprising the steps of:

scanning said multiple-instruction words to locate one or more loops of said multiple-instruction words;

comparing the program memory addresses of said words within said loops;

determining whether, from cycle to cycle, the number of bit changes in the binary representations of any of said program memory addresses can be reduced; and modifying at least one of said addresses in accordance with said determining step.

22. A method for optimizing a computer program for minimum power consumption by a computer executing said program, comprising the steps of:

finding cycle-to-cycle bit changes in a binary representation of said program in assembly language code, minimizing cycle-to-cycle bit changes in said binary code by at least one of the following:

aligning functional unit assignments to reduce the number of bits changing each time slot of an instruction word from one cycle to the next, or for instructions executable by more than one functional unit assigning functional units to avoid unnecessary bit switching from cycle-to-cycle, or minimizing the number of bits changing caused by changing from unconditional to conditional instructions or vice versa, or reordering operand and/or register assignments to reduce the number of bits changing in operand fields, or moving non-NOPs between fetch packets without affecting code functionality, or adding dummy instructions to reduce the number of times an instruction word slot switches from NOP to non-NOP to NOP without affecting data integrity, or modifying address sequences to minimize the number of address bits that change between execution packets.

* * * * *